A. SHAW.
Self-Supplying Cattle-Cribs.

No. 147,801. Patented Feb. 24, 1874.

Witnesses:

Inventor:
Arch Shaw
by Louis Bagger & Co.
his attorneys.

UNITED STATES PATENT OFFICE.

ARCH SHAW, OF OLATHE, KANSAS.

IMPROVEMENT IN SELF-SUPPLYING CATTLE-CRIBS.

Specification forming part of Letters Patent No. 147,801, dated February 24, 1874; application filed September 6, 1873.

*To all whom it may concern:*

Be it known that I, ARCH SHAW, of Olathe, in the county of Johnson and State of Kansas, have invented a new and useful Improvement in Self-Supplying Cribs, of which the following is a specification:

This invention relates to cribs for supplying cattle and other stock with corn or other grain or feed; and consists in the construction of the crib or house, so that the corn or other feed will be delivered by its own gravity, and the stock have access to it, as hereinafter described.

Figure 1:
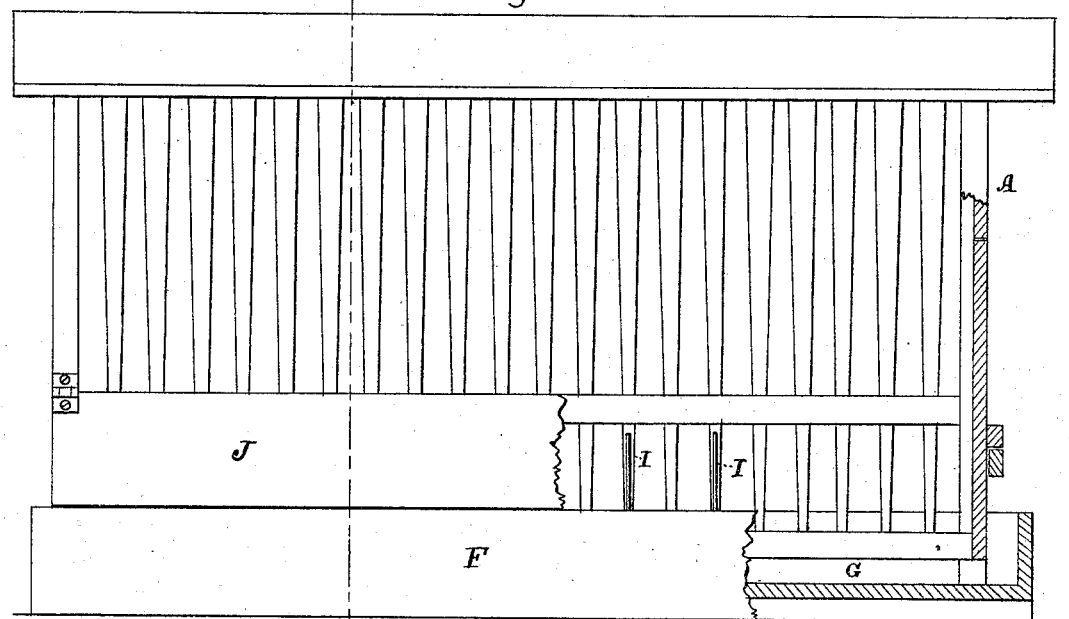
Figure 2:
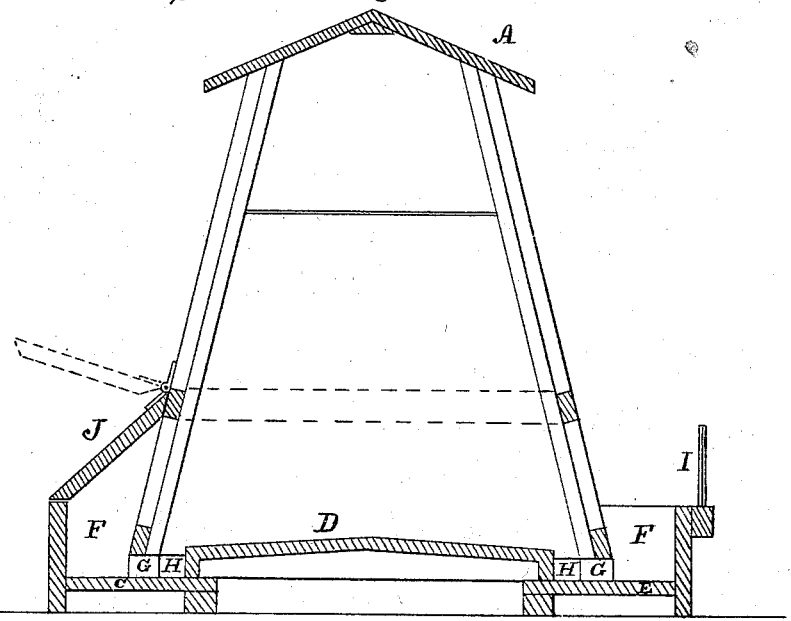

In the accompanying drawing, Figure 1 is a side view, partly in section. Fig. 2 is a vertical section of Fig. 1, taken on the line $x\ x$.

Similar letters of reference indicate corresponding parts.

A represents the crib, in which the floor consists of three (more or less) sections, C, D, and E. The section D is most elevated, and may be made inclining either in one or more directions, so that the corn supported thereby will have a tendency to slide from its most elevated part toward the walls or feeding-troughs of the crib. The bottoms C and E are dropped down and project outside of the walls and form the bottoms of the feeding-troughs F. The corner-posts of the crib extend below the walls, as seen in the drawing, so that there is a space or opening, G, between the bottom of the trough and bottom of the walls. H is a space inside the walls, formed by the offset from the elevated bottom D.

It will be seen that corn or other food placed in the crib will work from the bottom D into the space H, and outward through the space G into the feeding-troughs F, so as to be within reach of the stock. The weight of the contents of the crib creates a pressure which will constantly act to force outward the lower portion of the corn or other food. I represents vertical rods in the outer edges of the troughs to separate the cattle or other stock while feeding.

The spaces G and H may be made adjustable by means of movable boards or shutters, to adapt the crib to different kinds of grain and regulate the quantity thereof.

This crib may be made with a feeding-trough only on one side, or the troughs may extend entirely round the crib, or on two or three sides thereof, as may be found advisable.

With this crib the cattle or other stock are supplied without constant personal attention, one man being able to attend to several hundred head of cattle or other stock.

The troughs may be closed in whole or in part by means of doors or shutters J, as seen in Fig. 2, so as to accommodate a less number of cattle or other kinds of stock, if desired.

The crib on the inside being wider at the bottom than at the top enlarges the space and secures a regular and certain descent of corn or other feed toward the bottom of the crib and into the inside part of the trough. The boards being nailed upon the inside of the crib in a perpendicular position, and with the spaces between them increasing in width downward, prevents lodgement as the feed descends.

Having thus described my invention, I claim as new and desire to secure by Letters Patent—

In a self-supplying crib for cattle, the outwardly-projecting side wall, when the said side wall is formed by a series of flat-pointed slats having their points downward, so as to gradually widen the space between the slats, respectively, substantially as and for the purpose set forth.

ARCH SHAW.

Witnesses:
M. V. B. PARKER,
J. P. ST. JOHN.